United States Patent
Hanson

(10) Patent No.: US 10,301,537 B2
(45) Date of Patent: May 28, 2019

(54) METHODS FOR RECOVERING HYDROCARBON MATERIALS FROM SUBTERRANEAN FORMATIONS

(71) Applicant: ACULON, INC, San Diego, CA (US)

(72) Inventor: Eric Hanson, Encinitas, CA (US)

(73) Assignee: ACULON INC., San Diego, CA (US)

( * ) Notice: Subject to any disclaimer, the term of this patent is extended or adjusted under 35 U.S.C. 154(b) by 0 days.

(21) Appl. No.: 15/914,534

(22) Filed: Mar. 7, 2018

(65) Prior Publication Data

US 2018/0194993 A1    Jul. 12, 2018

Related U.S. Application Data

(63) Continuation of application No. 15/407,878, filed on Jan. 17, 2017, which is a continuation of application No. 14/197,258, filed on Mar. 5, 2014.

(51) Int. Cl.
*C09K 8/82* (2006.01)
*C09K 8/035* (2006.01)

(52) U.S. Cl.
CPC ............... *C09K 8/82* (2013.01); *C09K 8/035* (2013.01)

(58) Field of Classification Search
None
See application file for complete search history.

(56) References Cited

U.S. PATENT DOCUMENTS

| | | | | |
|---|---|---|---|---|
| 3,282,338 A | * | 11/1966 | Walther | C09K 8/56 166/295 |
| 5,311,946 A | * | 5/1994 | Harry | C09K 8/5755 166/278 |
| 7,441,598 B2 | * | 10/2008 | Nguyen | C09K 8/5083 166/250.1 |
| 7,608,571 B2 | | 10/2009 | Futterer et al. | |
| 7,879,437 B2 | * | 2/2011 | Hanson | C08L 83/04 428/207 |
| 8,053,395 B2 | | 11/2011 | Reddy et al. | |
| 2010/0044050 A1 | | 2/2010 | Savu et al. | |
| 2010/0267593 A1 | * | 10/2010 | Zhang | C09K 8/575 507/219 |
| 2010/0270021 A1 | | 10/2010 | Baran, Jr. et al. | |
| 2011/0021386 A1 | | 1/2011 | Ali et al. | |
| 2014/0224492 A1 | * | 8/2014 | Weaver | C09K 8/506 166/308.1 |
| 2015/0083415 A1 | | 3/2015 | Monroe | |
| 2015/0252656 A1 | | 9/2015 | Hanson | |

\* cited by examiner

*Primary Examiner* — Angela M DiTrani Leff
(74) *Attorney, Agent, or Firm* — Blynn L. Shideler; Krisanne Shideler; BLK Law Group

(57) ABSTRACT

A method for recovering hydrocarbon material from a subterranean formation includes introducing a treatment fluid into the subterranean formation. One treatment fluid includes at least one organometallic material having a metal or metalloid from Group III of the Periodic Table or a transition metal. An optional second fluid having an organophosphorous material can also be introduced. Another treatment fluid includes the reaction product of a transition metal compound and a silicon-containing material.

11 Claims, No Drawings

METHODS FOR RECOVERING HYDROCARBON MATERIALS FROM SUBTERRANEAN FORMATIONS

RELATED APPLICATIONS

This application is a continuation of application Ser. No. 15/407,878 filed on Jan. 17, 2017 and entitled "Methods for Recovering Hydrocarbon Materials from Subterranean Formations". Application Ser. No. 15/407,878 published as United States Patent Publication Number 2017/0253793 on Sep. 7, 2017 which publication is incorporated herein by reference in this application. Application Ser. No. 15/407,878 is a continuation of application Ser. No. 14/197,258, now abandoned. Application Ser. No. 14/197,258 was filed Mar. 5, 2014 and entitled "Methods for Recovering Hydrocarbon Materials from Subterranean Formations". Application Ser. No. 14/197,258 published as United States Patent Publication Number 2015/0252656 on Sep. 10, 2015, which publication is incorporated herein by reference in this application.

BACKGROUND OF THE INVENTION

Field of the Invention

This invention relates generally to the recovery of hydrocarbon materials, such as oil and natural gas, from subterranean hydrocarbon-bearing formations and, more particularly, to treatment fluids useful to improve the production of hydrocarbon materials therefrom.

Technical Considerations

Vast quantities of hydrocarbon materials ("hydrocarbons"), such as oil and natural gas, remain locked in subterranean rock formations throughout the world. These hydrocarbon materials are typically concentrated in seams, i.e., narrow cracks and fissures, in the formation and remain trapped there by capillary pressure. One way to unlock these hydrocarbon materials is through the process of hydraulic fracturing or "fracking". In fracking, a wellbore is drilled vertically to the level of the subterranean formation and then horizontally through a portion of the formation. An aqueous fracking fluid is injected at high pressure into the wellbore. This high pressure fluid expands or "fractures" the fissures to release the hydrocarbon materials, allowing these materials to flow through these newly created fractures to the wellbore and then through the wellbore back to the surface.

The fractures produced by hydraulic fracturing are relatively narrow, typically on the order of about 1 millimeter (mm). Since the fractures are narrow, the fracking fluid typically contains a proppant (such as sand) to hold the fractures open when the fluid is removed.

The fracking fluid may also contain a surfactant to lower the interfacial tension between the hydrocarbon material and the surrounding media. As will be appreciated by those skilled in the art, surfactants adhere at the hydrocarbon/media interface to reduce the interfacial tension between the two phases and allow the hydrocarbon material to flow more easily through the narrow fractures. However, this means that the adhered surfactant is by design removed along with the hydrocarbon material. As the surfactant level decreases, the interfacial tension between the remaining hydrocarbon/media increases. Since capillary pressure is proportional to interfacial tension, as the surfactant is depleted, the capillary pressure increases and it becomes harder and harder for the hydrocarbon material to flow through the narrow fractures. In addition to the surfactant removed with the hydrocarbon material, since conventional surfactants are generally water soluble, a portion of the injected surfactant may simply be washed away as the high pressure aqueous fracking fluid flows through the formation.

A particular concern with the recovery of gaseous hydrocarbons (such as natural gas) is the accumulation of water in the fractures. This water could be water remaining from the fracking fluid or could be from the surrounding geological area. This accumulated water (conventionally referred to as a "water block") reduces the effective permeability of the formation by blocking or reducing the flow of the gas through the fracture. If the drainage rate for the accumulated water from the fractures is low, the water blocks could remain in place for an extended period of time. As a result, gas recovery from the well can be reduced or completely stopped.

Therefore, it would be advantageous to provide a method of recovering hydrocarbon material from subterranean formations which reduces or overcomes at least some of the drawbacks of conventional hydrocarbon recovery methods. For example, it would be advantageous to provide a recovery method and/or composition that allows for decreased capillary pressure in the fractures even when the soluble surfactant levels decrease. It would also be advantageous to provide a method and/or composition that decreases water blocking of the fractures.

SUMMARY OF THE INVENTION

A method for recovering hydrocarbon material from a subterranean formation comprises introducing at least one treatment fluid into the subterranean formation. The at least one treatment fluid is introduced before or after a fracking fluid. The treatment fluid comprises at least one organometallic material. Examples of organometallic materials include one or more metals or metalloids selected from Group III of the Periodic Table and transition metals. The organometallic material can include a C1 to C18 alkoxide group.

An optional second treatment fluid comprising an organophosphorous material can also be introduced into the subterranean formation. The second treatment fluid can be introduced before or after the fracking fluid. In one embodiment, the optional second treatment fluid, if present, is introduced after the treatment fluid containing the organometallic material. Examples of the organophosphorous material include organophosphoric acid, organophosphonic acid, organophosphinic acid, and derivatives thereof.

Another method for recovering hydrocarbon material from a subterranean formation comprises introducing a first treatment fluid into the subterranean formation. The first treatment fluid comprises an organometallic material. The organometallic material comprises at least one metal or metalloid selected from the group consisting of members of Group III of the Periodic Table, and transition metals of Groups IIIB, IVB, VB and VIB of the Periodic Table. The organometallic material also comprises a C1 to C18 alkoxide group. A second treatment fluid is also introduced into the subterranean formation. The second treatment fluid comprises an organophosphorous material, wherein the organophosphorous material comprises an organophosphorous acid or derivative thereof comprising at least one group selected from the group consisting of an aliphatic group, an olefinic group, and an aryl-substitute group. The first treatment fluid and second treatment fluid are introduced either before or after a fracking fluid. In one preferred embodiment, the second treatment fluid is introduced after the first treatment fluid.

A further method for recovering hydrocarbon material from a subterranean formation comprises introducing at least one treatment fluid into the subterranean formation. The at least one treatment fluid comprises a material comprising the reaction product of a transition metal compound and a silicon-containing material. Examples of the transition metal compound include transition metals from Period 6 of the Periodic Table of Elements. Further specific examples of transition metals include La, Hf, Ta, W, Nb, and transition metals having electrons in the f orbital.

An additional method for recovering hydrocarbon material from a subterranean formation comprises introducing a first treatment fluid comprising divalent metal cations into the subterranean formation and introducing a second treatment fluid into the subterranean formation. The second treatment fluid comprises the reaction product of a transition metal compound and a silicon-containing material. The first treatment fluid and/or the second treatment fluid can be introduced either before or after a fracking fluid.

A composition for treating subterranean hydrocarbon-bearing formations comprises the reaction product of a transition metal compound and a silicon-containing material. The reaction product is configured to reduce the capillary pressure in fractures in the formation.

DESCRIPTION OF THE PREFERRED EMBODIMENTS

As used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Additionally, all documents, such as but not limited to, issued patents and patent applications, referred to herein are to be considered to be "incorporated by reference" in their entirety. Any reference to amounts, unless otherwise specified, is "by weight percent". The terms "polymer" or "polymeric" include oligomers, homopolymers, copolymers, and terpolymers, e.g., polymers formed from two or more types of monomers or polymers. The term "film" is used to describe an area of a particular composition or material. The film need not be a continuous film but could be formed by discrete areas of the composition or material.

The present invention relates to methods and compositions for increasing the production of hydrocarbon materials, such as oil and natural gas, from subterranean formations. The invention will be described with reference to use in a conventional fracking operation. However, it is to be understood that the invention is not limited to fracking but could be used in any enhanced oil or gas recovery system.

In a typical fracking operation, a well bore is drilled into a hydrocarbon-containing subterranean formation and high-pressure fracking fluid is injected into the formation. However, in the practice of the invention, a treatment fluid of the invention is injected into the formation either before or after the fracking fluid. In another exemplary practice of the invention, a treatment fluid comprising a composition of the invention can be injected separately from the fracking fluid (such as before or after the fracking fluid) or can be is included in the fracking fluid.

As will be appreciated by one skilled in the art, large portions of subterranean hydrocarbon-bearing formations are composed of silicate-based rock. Without being limited by theory, it is believed that the materials of the invention adsorb or chemically bond with the rock surfaces, e.g., the walls of the fractures. This lowers the surface energy between the rock surfaces and the hydrocarbon materials, which reduces the capillary pressure in the fractures. The reduced capillary pressure improves the flow of the hydrocarbon material through the fractures. Additionally, it is believed that the materials of the invention, once adsorbed or bonded to the rock surfaces, will improve water drainage rates to help reduce existing water blocks as well as to reduce the formation of water blocks.

The invention provides several advantages over conventional recovery methods. For example, by adsorbing or bonding the surface active materials of the invention to the rock surfaces of the subterranean formation, these surface active materials are not removed with the hydrocarbon material, as are conventional surfactants. Additionally, the materials of the invention are less likely to be washed away by the movement of the fracking fluid through the formation, as can occur with conventional surfactants.

In a first exemplary method of the invention, after the well bore is drilled, a treatment fluid of the invention containing at least one organometallic material is injected into the subterranean formation. The treatment fluid can be injected either before or after the fracking fluid. In one non-limiting embodiment of the invention, the treatment fluid is injected prior to the injection of the fracking fluid. The treatment fluid can be prepared, for example, by mixing a concentrated solution of the organometallic material with a carrier fluid. Preferably, the organometallic material includes one or more labile groups (M-OR bonds) capable of bonding, for example via a condensation reaction, with active silanol groups and/or Si—O—Si groups on the rock surface to form a stable Si—O-M bond to attach the organometallic material to the rock surface. Other reactive groups can be used to attach other functional ligands, such as hydrocarbon or fluorocarbon groups.

The organometallic material preferably is derived from an organo metal, such as those in which the metal has electrons in the f electron orbital, such as metals selected from Period 6 of the Periodic Table of elements (lanthanide series). Other examples of suitable metals include La, Hf, Ta, and W, with Ta being preferred. An example of another suitable metal is niobium. The organo portion of the metal is preferably an alkoxide containing from 1 to 18, preferably 2 to 8 carbon atoms such as ethoxide, propoxide, isopropoxide, butoxide, isobutoxide and tertiary butoxide. The alkoxides may be in the form of simple esters and polymeric forms of the esters. For example, with the preferred metal Ta, the simple esters would be $Ta(OR)_5$ where R is $C_1$ to $C_{18}$ alkyl. Polymeric esters would be obtained by condensation of the alkyl esters mentioned above and typically would have the structure RO—[Ta(OR)$_3$—O—]$_x$R where R is defined above and x is a positive integer. Besides alkoxides, other ligands can be present such as acetyl acetonates. Also, ligands such as chloride, acetylacetonate, alkanolamine and lactate, etc. may be present.

The organometallic material may be dissolved or dispersed in a diluent (carrier fluid). Examples of suitable diluents are alcohols such as methanol, ethanol and propanol, aliphatic hydrocarbons, such as hexane, isooctane and decane, ethers, for example, tetrahydrofuran and dialkylethers such as diethylether.

Also, adjuvant materials may be present in the treatment fluid. Examples include stabilizers such as sterically hindered alcohols and acids, surfactants and anti-static agents. The adjuvants if present are present in amounts of up to 30 percent by weight based on the non-volatile content of the composition.

The concentration of the organometallic material in the composition is not particularly critical but is usually at least 0.01 millimolar, typically from 0.01 to 100 millimolar, and more typically from 0.1 to 50 millimolar.

The organometallic treatment fluid can be obtained by mixing all of the components at the same time with low shear mixing or by combining the ingredients in several steps. The organometallic compounds described above are reactive with moisture, and care should be taken that moisture is not introduced with the diluent or adjuvant materials and that mixing is conducted in a substantially anhydrous atmosphere.

Without being limited by theory, it is believed that the organometallic material bonds with the rock surface to form a polymeric metal oxide film, which may have unreacted alkoxide and hydroxyl groups for subsequent reaction and possible covalent bonding with an optional overlayer material, as described below.

Although not intending to be bound by any theory, it is believed the polymeric metal oxide is of the structure:

where M is the metal of the invention, R is an alkyl group containing from 1 to 30 carbon atoms; x+y+z=V, the valence of M; x is at least 1, y is at least 1, z is at least 1; x=V−y−z; y=V−x−z; z=V−x−y; n is greater than 2, such as 2 to 1000.

As mentioned above, after the treatment fluid containing the organometallic material (i.e., a first treatment fluid) is injected into the formation to attach the polymeric metal oxide film to the rock surface, an optional second treatment fluid can be injected into the formation. The second treatment fluid contains a material capable of connecting, for example chemically bonding, with the polymeric metal oxide film to form an overlayer or a different film. Such an overlayer material preferably contains groups that are reactive with alkoxide and/or hydroxyl groups, such as hydroxyl groups or acid groups or derivatives thereof.

Preferably, the reactive material of the second treatment fluid is an organic acid or a derivative thereof. The acid may be a carboxylic acid, a sulfonic acid or a phosphorus acid, such as a phosphoric acid, a phosphonic acid, or a phosphinic acid. By derivatives of acids are meant functional groups that perform similarly as acids such as acid salts, acid esters and acid complexes. The organo group of the acid may be monomeric, oligomeric or polymeric. For example, the organo acid may be a monomeric, phosphoric, phosphonic or phosphinic acid.

Examples of monomeric phosphoric acids are compounds or a mixture of compounds having the following structure:

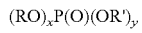

wherein x is 1-2, y is 1-2 and x+y=3, R is a radical having a total of 1-30, preferably 6-18 carbons, where R' is H, a metal such as an alkali metal, for example, sodium or potassium, alkyl including substituted alkyl having 1 to 50 carbons, preferably 1 to 4 carbons such as methyl or ethyl, including substituted aryl having 6 to 50 carbons; preferably, a portion of R' is H. The organic component of the phosphoric acid (R) can be aliphatic (e.g., alkyl having 2-20, preferably 6-18 carbon atoms) including an unsaturated carbon chain (e.g., an olefin), or can be aryl or aryl-substituted moiety.

Example of monomeric phosphonic acids are compounds or mixture of compounds having the formula:

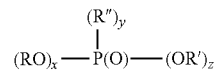

wherein x is 0-1, y is 1, z is 1-2 and x+y+z is 3. Preferably, R and R" are each independently a radical having a total of 1-30, preferably 6-18 carbons. R' is H, a metal, such as an alkali metal, for example, sodium or potassium or an amine or alkyl including substituted alkyl having 1 to 50 carbon atoms, preferably lower alkyl having 1-4 carbons such as methyl or ethyl, or aryl including substituted aryl having 6 to 50 carbons. Preferably at least a portion of R' is H. The organic component of the phosphonic acid (R and R") can be aliphatic (e.g., alkyl having 2-20, preferably 6-18 carbon atoms) including an unsaturated carbon chain (e.g., an olefin), or can be an aryl or aryl-substituted moiety.

Example of monomeric phosphinic acids are compounds or mixture of compounds having the formula:

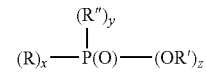

wherein x is 0-2, y is 0-2, z is 1 and x+y+z is 3. Preferably, R and R" are each independently radicals having a total of 1-30, preferably 6-18 carbons. R' is H, a metal, such as an alkali metal, for example, sodium or potassium or an amine or alkyl including substituted alkyl having 1 to 50 carbon atoms, preferably lower alkyl having 1-4 carbons, such as methyl or ethyl, or aryl including substituted aryl having 6 to 50 carbons. Preferably a portion of R' is H. The organic component of the phosphinic acid (R, R") can be aliphatic (e.g., alkyl having 2-20, preferably 6-18 carbon atoms) including an unsaturated carbon chain (e.g., an olefin), or can be an aryl or aryl-substituted moiety.

Examples of organo groups which may comprise R and R" include long and short chain aliphatic hydrocarbons, aromatic hydrocarbons and substituted aliphatic hydrocarbons and substituted aromatic hydrocarbons. Examples of substituents include carboxyl such as carboxylic acid, hydroxyl, amino, imino, amido, thio, cyano, and fluoro.

Representative of the organophosphorous acids are as follows: amino trismethylene phosphonic acid, aminobenzylphosphonic acid, 3-amino propyl phosphonic acid, O-aminophenyl phosphonic acid, 4-methoxyphenyl phosphonic acid, aminophenylphosphonic acid, aminophosphonobutyric acid, aminopropylphosphonic acid, benzhydrylphosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphonic acid, naphthylmethylphosphonic acid, octadecylphosphonic acid, octyiphosphonic acid, pentylphosphonic acid, phenylphosphinic acid, phenylphosphonic acid, bis-(perfluoroheptyl) phosphinic acid, perfluorohexyl phosphonic acid, styrene phosphonic acid, dodecyl bis-1, 12-phosphonic acid, poly (hexafluoropropyl)phosphonic acid.

In addition to the monomeric organophosphorous acids, oligomeric or polymeric organophosphorous acids resulting from self-condensation of the respective monomeric acids may be used.

To provide hydrophobic properties to the overlayer, the organic acid or derivative thereof may be a fluorinated material, typically a perfluorinated oligomer having a number average molecular weight of less than 2000. The perfluorinated material can be a perfluorinated hydrocarbon of the following structure:

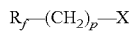

where $R_f$ is a perfluorinated alkyl group or a perfluorinated alkylene ether group and p is 2 to 4, preferably 2.

Examples of perfluoroalkyl groups are those of the structure:

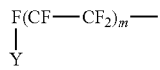

where Y is F or $C_nF_{2n+1}$; m is 4 to 20 and n is 1 to 6.

Examples of perfluoroalkylene ether groups are those of the structure:

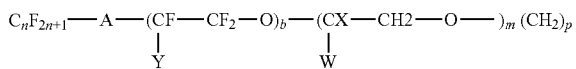

where A is an oxygen radical or a chemical bond; n is 1 to 6; Y is F or $C_nF_{2n+1}$; W is H, F, $C_nH_{2n}$ or $C_nF_{2n}$; b is 2 to 10, m is 0 to 6, and p is 0 to 18.

X is an acid group or an acid derivative. Preferably, X is:

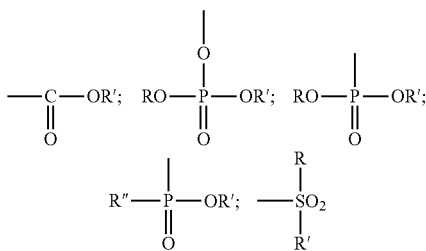

where R and R" are a hydrocarbon or substituted hydrocarbon radical having up to 200, such as 1 to 30 and 6 to 20 carbons, R can also include the perfluoroalkyl groups mentioned above, and R' is H, a metal such as potassium or sodium or an amine or an aliphatic radical, for example, alkyl including substituted alkyl having 1 to 50 carbons, preferably lower alkyl having 1 to 4 carbons such as methyl or ethyl, or aryl including substituted aryl having 6 to 50 carbons.

Examples of fluorinated materials are esters of perfluorinated alcohols such as the alcohols of the structure:

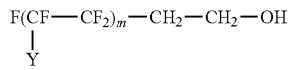

where Y is F or $C_nF_{2n+1}$; m is 4 to 20 and n is 1 to 6.

Examples of suitable esters are stearates and citrates of such alcohols. Such materials are available from E. I. du Pont de Nemours and Company under the trademark ZONYL FTS and ZONYL TBC.

The overlayer material (e.g., the organophosphorous material) can be dissolved in a liquid diluent (carrier fluid). The concentration of the overlayer material is typically dilute, for example, no greater than 10 percent on a weight/volume basis for solid overlayer material and 10 percent on a volume/volume basis for oil and liquid overlayer material, and preferably is within the range of 0.01 to 1.0 percent. The percentages are based on total weight or volume of the solution.

Examples of suitable diluents are hydrocarbons, such as hexane isooctane and toluene; ketones, such as methyl ethyl ketone; alcohols, such as methanol and ethanol; ethers, such as tetrahydrofuran. Fluorinated solvents such as nonafluorobutylmethyl ether and fluorinated solvents available as HFE-7100, supplied by 3M Innovative Products and perfluorinated ethers supplied by Solvay Solexis under the trademark GALDEN are preferred for use with the fluorinated material. The fluorinated solvents can be used in admixtures with the other solvents mentioned above. The fluorinated solvents or diluents are different from the fluorinated materials in that the fluorinated solvents or diluents are not film formers, whereas the fluorinated materials are.

The resultant layer typically is thin, having a thickness of about 10-100 nanometers or less. The fluorinated overlayers are hydrophobic, having a water contact angle greater than 70°, typically from 75-130°. The water contact angle can be determined using a contact angle goniometer such as a TANTEC contact angle meter Model CAM-MICRO.

In the above described method, the organometallic material-containing treatment fluid of the invention is first injected into the formation to adhere the organometallic material to the rock surface. This may optionally, but not necessarily, be followed by injection of the second organophosphorous material-containing treatment fluid to attach the organophosphorous material to the previously adhered organometallic material. After which, the fracking fluid is injected in conventional manner. The adhered material of the invention reduces the capillary pressure in the fractures to promote the flow of the hydrocarbon material and also to help prevent water blocks.

However, in another embodiment of the invention, a treatment fluid containing a surface modifying material as described below is injected into the formation rather than the fluids described above. This surface modifying material is capable of adhering or bonding with the rock surface of the formation. The surface modifying material comprises the reaction product of a transition metal compound and a silicon-containing material.

The transition metal material includes a compound preferably derived from niobium, lanthanum, or transition metals that have electrons in the f electron orbital, such as metals selected from Period 6 (lanthanide series) of the Periodic Table of elements. Examples of suitable metals include La, Hf, Ta, and W, with Ta being preferred. The ligand associated with the transition metal may be an alkoxide containing from 1 to 18, preferably 2 to 8 carbon atoms such as ethoxide, propoxide, isopropoxide, butoxide, isobutoxide and tertiary butoxide. The alkoxides may be in the form of simple esters and polymeric forms of the esters. For example, with the preferred metal Ta, the simple esters would be $Ta(OR)_5$ where R is $C_1$ to $C_{18}$ alkyl. Polymeric esters would be obtained by condensation of the alkyl esters mentioned above and typically would have the structure $RO-[Ta(OR)_3-O-]_xR$ where R is defined above and x is a positive integer. Besides alkoxides, examples of other ligands are halides, particularly chloride, acetyl acetonates, alkanolamine and lactate. Mixed ligands such as alkoxides and acetyl acetonates may also be present. $TaCl_5$ is a preferred transition metal compound.

Examples of silicon-containing materials are organosilicon-containing materials such as those having the formula:

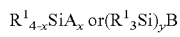

and organo(poly)siloxanes and organo(poly)silazanes containing units of the formula:

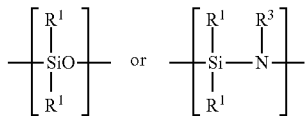

where $R^1$ are identical or different and are a hydrocarbon radical including a substituted, hydrocarbon radical such as halo, particularly fluoro-substituted hydrocarbon radical containing from 1 to 100, such as 1 to 20 carbon atoms and 1 to 12, preferably 1 to 6 carbon atoms. A in the above structural formula may be hydrogen, a halogen such as chloride, OH, $OR^2$ or

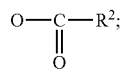

B in the above structural formula can be $NR^3{}_{3-y}$. $R^2$ is a hydrocarbon or substituted hydrocarbon radical containing from 1 to 12, typically 1 to 4 carbon atoms. $R^3$ is hydrogen or has the same meaning as $R^1$. x is 1, 2 or 3, y is 1 or 2.

Preferably, $R^1$ is a fluoro-substituted hydrocarbon. Examples of such fluoro substituted hydrocarbons are those of the structure:

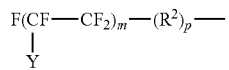

where Y is F or $C_nF_{2n+1}$; m is 4 to 20 and n is 1 to 6, $R^2$ is alkyl containing from 1 to 4 carbon atoms and p is 0 to 18. Also, fluoro-substituted hydrocarbons may be of the structure:

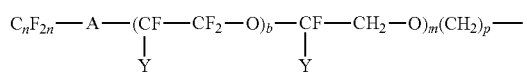

where A is an oxygen radical or a chemical bond; n is 1 to 6, y is F or $C_n,F_{2n}$; b is at least 1, such as 2 to 10; m is 0 to 6 and p is 0 to 18.

The organosilicon material can also be an organo(poly)siloxane or an organo(poly)silazane such as those having the structural units:

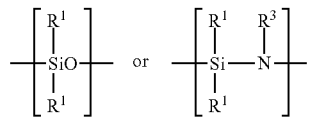

where $R^1$ is a hydrocarbon or substituted hydrocarbon having from 1 to 12, preferably 1 to 6 carbon atoms such as methyl and ethyl and $R^3$ is hydrogen or a hydrocarbon or substituted hydrocarbon having 1 to 12, preferably 1 to 6 carbon atoms. The organo(poly)siloxane may contain additional units of the formula:

where $R^5$ is a halogen such as a chloro or fluoro substituent.

The organo(poly)siloxane and organo(poly)silazane typically have a number average molecular weight of at least 400, usually between 1000 and 5,000,000.

The reaction products can be prepared by mixing the transition metal compound and the silicon-containing material in a closed system (i.e., low humidity) to avoid hydrolysis of the reactants. Reaction can occur neat or in the presence of a nonreactive solvent such as chlorinated or fluorinated solvent, for example, methylene chloride. Reaction occurs rapidly at room temperature and is complete from 1 to 30 minutes depending upon the reactants. Also, once again depending upon the reactants, heat can be used to initiate and complete the reaction. Solvent can be removed by evaporation and the reaction product can be redissolved in a suitable solvent such as an alcohol, for example, ethanol or propanol, for application to the substrate. The mole ratio of the organosilicon-containing material to transition metal compound is typically from 100:1 to 1:100, preferably from 1:1 to 10:1 depending on the valence of the transition metal compound. For example, the molar ratio of organosilicon compound to Ta(V) is typically 5 to 1.

The reaction product or the partially reacted reaction product or the mixture of reactants may be contained in an organic diluent. Examples of suitable diluents are alcohols such as methanol, ethanol and propanol, aliphatic hydrocarbons such as hexane, isooctane and decane, ethers, for example, tetrahydrofuran, and dialkylethers such as diethylether. To make the resulting complex more stable, the ligands can be modified (e.g. by exchanging 2-ethylhexanol ligands for isopropoxide ligands) on the transition metal specie.

Also, adjuvant materials may be present. Examples include stabilizers such as sterically hindered alcohols and acids or surfactants. Also, additional active agents may also be incorporated into the fluid, such as antibacterial agents, anti-static compounds, lubricants, olfactory agents, etc. The adjuvants if present are present in amounts of up to 30 percent by weight based on the non-volatile content of the composition.

The concentration of the reaction product in the composition is not particularly critical but is usually at least 0.01 millimolar, typically from 0.01 to 100 millimolar, and more typically from 0.1 to 50 millimolar.

The composition can be obtained by mixing all of the components at the same time with low shear mixing or by combining the ingredients in several steps. The reaction product is reactive with moisture, and care should be taken that moisture is not introduced with the diluent or adjuvant materials and that mixing is conducted in a substantially anhydrous atmosphere.

The transition metal material and the silicon-containing material are typically dissolved or dispersed in organic diluent such as described above. The concentrations of the separate materials in the diluent are at least 0.1 millimolar, typically from 0.01 to 100 millimolar, and more typically from 0.1 to 50 millimolar. Adjuvants such as those described above can be included in one or both of the dispersions or solutions.

As will be appreciated by one skilled in the art, the number of reactive Si—OH groups on the surface of the rock formation may likely be low due to self-condensation reactions that have occurred over the course of millennia. Therefore, in another aspect of the invention, a stabilization fluid can be injected into the subterranean formation, for example prior to injection of the treatment fluids and/or the fracking fluid. The stabilization fluid contains a stabilization material capable of increasing the density of silanol groups on the rock surface and/or stabilizing the silanol groups against self-condensation. An exemplary stabilization fluid is an aqueous solution containing divalent metal cations.

The following example is intended to illustrate the invention, and should not be construed as limiting the invention as many different embodiments can be made without departing from the spirit and scope of the invention. Therefore, the invention is not limited except as defined in the claims.

EXAMPLE

This example illustrates the application of coating compositions of the invention onto carbonaceous shale substrates and the effect of the coating compositions on the contact angle measurement of a water droplet subsequently applied onto the coated carbonaceous shale substrates.

The substrates were made by cleaving a carbonaceous shale block (commercially available from Ward's Natural Science) into flat pieces. The shale substrates simulate the rock surfaces of a hydrocarbon-bearing subterranean rock formation. No pre-cleaning or soaking with reagents was performed on the cleaved substrates prior to coating the substrates as described below.

The percent values of components used in this example are in volume percent, unless otherwise indicated. The reported contact angle values were measured using a TANTEC Contact Angle Meter, Model CAM-MICRO (commercially available from Tantec Inc.).

Materials

Formulation A 1.5% Gelest XG-2110 (a heptadecafluorodecyl-terminated poly(dimethylsiloxane) having a reported molecular weight in the range of 6,000 to 7,000 and commercially available from Gelest, Inc.)
0.5% Gelest DMS-S15 (a silanol-terminated poly(dimethylsiloxane) having a reported molecular weight in the range of 2,000 to 3,500 and commercially available from Gelest, Inc.)
0.2% tantalum (V) ethoxide
Soltrol-10 solvent (an isooctane blend commercially available from Chevron Phillips Chemical Company LP)

Formulation B 1.5% Gelest ALT-143 (a poly(n-octylmethylsiloxane) commercially available from Gelest, Inc.)
0.5% Gelest DMS-S15 (a silanol-terminated poly(dimethylsiloxane) having a reported molecular weight in the range of 2,000 to 3,500 and commercially available from Gelest, Inc.)
0.2% tantalum (V) ethoxide
Soltrol-10 solvent (an isooctane blend commercially available from Chevron Phillips Chemical Company LP)

Procedure

The cleaved carbonaceous shale substrates were dipped into either Formulation A or Formulation B for 30 minutes, removed, then rinsed with fresh hexanes. Then the contact angle of water droplets on the substrates was measured.

Results

Control: the carbonaceous shale substrates (i.e., cleaved from the block but not dipped in either Formulation A or Formulation B) provided an average contact angle of less than or equal to 10. The water droplets were almost immediately absorbed into the shale substrates.

Formulation A: the shale substrates immersed in Formulation A provided an average contact angle of 124 degrees.

Formulation B: the shale substrates immersed in Formulation B provided an average contact angle of 120 degrees.

As can be seen from the above results, a significant change in water contact angle was achieved by the application of the exemplary coating formulations onto the surface of the carbonaceous shale substrates compared to the contact angle measured on the surface of the non-coated shale substrates. The hydrophobicity of the carbonaceous shale surface was increased by application of the coatings. Applicants believe a similar result (i.e., an increase in the hydrophobicity of the rock surfaces of the fissures formed during the fracking operation) will be obtained in accordance with the practice of the invention by injecting the compositions of the invention into the hydrocarbon-bearing subterranean rock formations, although the increase in hydrophobicity may not necessarily be to the same extent as in the examples described above. However, any increase in hydrophobicity will aid in the flow of hydrocarbon material through the fissures and the drainage of water blocks from the fissures.

It will be readily appreciated by one of ordinary skill in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A method for increasing production of hydrocarbon material from a subterranean formation having a rock surface, said method comprising: introducing at least one treatment fluid into the subterranean formation, wherein the at least one treatment fluid comprises a surface modifying material which is dissolved in a non-aqueous diluent and which surface modifying material comprises the reaction product of: (a) a transition metal compound; and (b) a silicon-containing material, wherein the silicon-containing material has a formula selected from:

$$R^1_{4-x}SiA_x \text{ or } (R^1_3Si)_yB$$

or an organo(poly)siloxane and an organo(poly)silazane containing units of the formula:

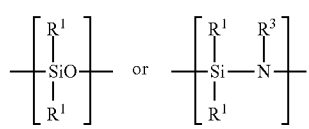

where: $R^1$ are identical or different and are a hydrocarbon or substituted hydrocarbon radical containing from 1 to 100 carbon atoms, A is hydrogen, halogen, OH, $OR^2$ or

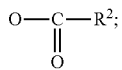

B is $NR^3_{3-y}$, $R^2$ is a hydrocarbon or substituted hydrocarbon radical containing from 1 to 12 carbon atoms, $R^3$ is hydrogen or is the same as $R^1$ x is 1, 2 or 3, and y is 1 or 2, whereby the surface modifying material adheres to or bonds with the rock surface, thereby lowering surface energy between the rock surface and the hydrocarbon material and promoting flow of the hydrocarbon material through the subterranean formation for recovery.

2. The method of claim 1, wherein the silicon-containing material has the following formula:

where $R^1$ is a fluoro-substituted hydrocarbon and A is $OR^2$.

3. The method of claim 2, wherein $R^1$ is of the structure:

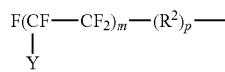

where Y is F or $C_nF_{2n+1}$; m is 4 to 20; n is 1 to 6; $R^2$ is alkyl containing from 1 to 4 carbon atoms; and p is 0 to 18.

4. The method of claim 2, wherein the fluoro-substituted hydrocarbon is of the structure:

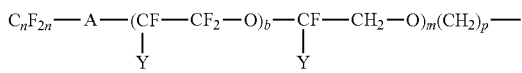

where A is an oxygen radical or a chemical bond; n is 1 to 6; Y is F or $C_nF_{2n+1}$; b is at least 1; m is 0 to 6 and p is 0 to 18.

5. A method for increasing production of hydrocarbon material from a subterranean formation having a rock surface, said method comprising: introducing at least one treatment fluid into the subterranean formation, wherein the at least one treatment fluid is introduced into the subterranean formation as a fluid either before or after introduction of a tracking fluid and comprises a surface modifying material which is dissolved in a non-aqueous diluent and which surface modifying material comprises the reaction product of: (a) a transition metal compound; and (b) a silicon-containing material, whereby the surface modifying material adheres to or bonds with the rock surface, thereby lowering surface energy between the rock surface and the hydrocarbon material and promoting flow of the hydrocarbon material through the subterranean formation for recovery, wherein the silicon-containing material is an organo(poly)siloxane or an organo(poly)silazane and wherein the organo(poly)siloxane and organo(poly)silazane include units of the formula:

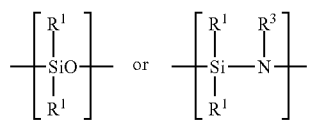

where $R^1$ are identical or different and are a hydrocarbon or substituted hydrocarbon radicals containing from 1 to 12 carbon atoms and $R^3$ is hydrogen or is the same as $R^1$.

6. The method of claim 5, wherein the organo(poly)siloxane contains additional units of the formula:

where $R^5$ contains a halogen.

7. The method of claim 5, wherein the organo(poly)siloxane and organo(poly)silazane have a number average molecular weight of at least 400.

8. A method for increasing production of hydrocarbon material from a subterranean formation having a rock surface, said method comprising: introducing a first treatment fluid comprising divalent metal cations into the subterranean formation; and introducing a second treatment fluid into the subterranean formation, wherein the second treatment fluid comprises a surface modifying material which is dissolved in a non-aqueous diluent and which surface modifying material comprises the reaction product of: (a) a transition metal compound; and (b) a silicon-containing material and wherein the second fluid treatment is introduced into the subterranean formation as a fluid either before or after introduction of a tracking fluid, whereby the surface modifying material adheres to or bonds with the rock surface, thereby lowering surface energy between the rock surface and the hydrocarbon material and promoting flow of the hydrocarbon material through the subterranean formation for recovery, wherein the silicon-containing material has a formula selected from:

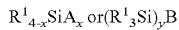

or an organo(poly)siloxane and an organo(poly)silazane containing units of the formula:

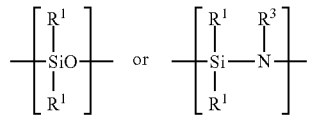

where: $R^1$ are identical or different and are a hydrocarbon or substituted hydrocarbon radical containing from 1 to 100 carbon atoms, A is hydrogen, halogen, OH, $OR^2$ or

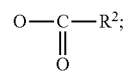

B is $NR^3_{3-y}$, $R^2$ is a hydrocarbon or substituted hydrocarbon radical containing from 1 to 12 carbon atoms, $R^3$ is hydrogen or is the same as $R^1$ x is 1, 2 or 3, and y is 1 or 2.

9. The method of claim 8, wherein the silicon-containing material has the following formula:

$$R^1_{4-x}SiA_x$$

where $R^1$ is a fluoro-substituted hydrocarbon and A is $OR^2$.

10. The method of claim 9, wherein the fluoro-substituted hydrocarbon is of the structure:

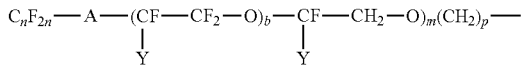

where A is an oxygen radical or a chemical bond; n is 1 to 6; Y is F or $C_nF_{2n+1}$; b is at least 1; m is 0 to 6 and p is 0 to 18.

11. A method for increasing production of hydrocarbon material from a subterranean formation having a rock surface, said method comprising: introducing a first treatment fluid comprising divalent metal cations into the subterranean formation; and introducing a second treatment fluid into the subterranean formation, wherein the second treatment fluid comprises a surface modifying material which is dissolved in a non-aqueous diluent and which surface modifying material comprises the reaction product of: (a) a transition metal compound; and (b) a silicon-containing material and wherein the second fluid treatment is introduced into the subterranean formation as a fluid either before or after introduction of a tracking fluid, whereby the surface modifying material adheres to or bonds with the rock surface, thereby lowering surface energy between the rock surface and the hydrocarbon material and promoting flow of the hydrocarbon material through the subterranean formation for recovery, wherein the silicon-containing material is an organo(poly)siloxane or an organo(poly)silazane and wherein the organo(poly)siloxane and organo(poly)silazane include units of the formula:

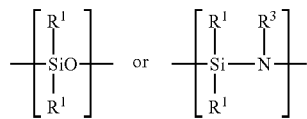

where $R^1$ are identical or different and are a hydrocarbon or substituted hydrocarbon radicals containing from 1 to 12 carbon atoms and $R^3$ is hydrogen or is the same as $R^1$.

* * * * *

UNITED STATES PATENT AND TRADEMARK OFFICE
CERTIFICATE OF CORRECTION

PATENT NO. : 10,301,537 B2
APPLICATION NO. : 15/914534
DATED : May 28, 2019
INVENTOR(S) : Eric Hanson Page 1 of 1

It is certified that error appears in the above-identified patent and that said Letters Patent is hereby corrected as shown below:

In the Claims

Column 13,
Line 62 should read:
of a fracking fluid and comprises a surface modifying Column 14,
Line 39 should read:
introduction of a fracking fluid, whereby the surface modi- Column 16,
Line 7 should read:
introduction of a fracking fluid, whereby the surface modi- Signed and Sealed this
Thirteenth Day of August, 2019

Andrei Iancu
*Director of the United States Patent and Trademark Office*